United States Patent
Humphrey

(10) Patent No.: US 10,771,690 B2
(45) Date of Patent: Sep. 8, 2020

(54) DISTRIBUTED APERTURE SYSTEMS FOR OBSTACLE AVOIDANCE

(71) Applicant: Goodrich Corporation, Charlotte, NC (US)

(72) Inventor: Ian Peter Humphrey, Foxboro, MA (US)

(73) Assignee: Goodrich Corporation, Charlotte, NC (US)

( * ) Notice: Subject to any disclaimer, the term of this patent is extended or adjusted under 35 U.S.C. 154(b) by 10 days.

(21) Appl. No.: 15/893,624

(22) Filed: Feb. 10, 2018

(65) Prior Publication Data

US 2019/0253621 A1    Aug. 15, 2019

(51) Int. Cl.
| | |
|---|---|
| *G01S 17/89* | (2020.01) |
| *H04N 5/232* | (2006.01) |
| *G06T 7/521* | (2017.01) |
| *G06T 15/00* | (2011.01) |
| *H04N 3/14* | (2006.01) |
| *H04N 5/265* | (2006.01) |
| *G08G 5/04* | (2006.01) |
| *G01S 17/87* | (2020.01) |
| *G01S 17/933* | (2020.01) |

(52) U.S. Cl.
CPC ......... *H04N 5/23232* (2013.01); *G01S 17/87* (2013.01); *G01S 17/89* (2013.01); *G01S 17/933* (2013.01); *G06T 7/521* (2017.01); *G06T 15/00* (2013.01); *G08G 5/04* (2013.01); *H04N 3/1562* (2013.01); *H04N 5/23238* (2013.01); *H04N 5/265* (2013.01); *G06T 2207/10028* (2013.01); *G06T 2207/20221* (2013.01); *G06T 2207/30261* (2013.01)

(58) Field of Classification Search
CPC ............ H04N 5/23232; H04N 3/1562; H04N 5/23238; H04N 5/265; G06T 7/521; G06T 15/00; G06T 2207/10028; G06T 2207/20221; G06T 2207/30261; G08G 5/04

See application file for complete search history.

(56) References Cited

U.S. PATENT DOCUMENTS

| | | |
|---|---|---|
| 7,405,834 B1 | 7/2008 | Marron et al. |
| 9,678,209 B2 | 6/2017 | Ruff et al. |
| 9,746,323 B2 | 8/2017 | Wood et al. |

(Continued)

FOREIGN PATENT DOCUMENTS

EP    3078988 A1    10/2016

OTHER PUBLICATIONS

Extended European Search Report for European Patent Application No. EP19156468.1, dated Jun. 21, 2019.

*Primary Examiner* — John R Schnurr
(74) *Attorney, Agent, or Firm* — Locke Lord LLP; Scott D. Wofsy; Judy R. Naamat

(57) ABSTRACT

A distributed aperture system includes a first aperture and a second aperture. The first aperture has a first field of regard and a first resolution. The second aperture has a second aperture and a second resolution and a second field of regard. The second field of regard overlaps the first field of regard and the second resolution is greater than the first resolution to provide high resolution heading information and low resolution peripheral information in a common 3D image for obstacle avoidance. Obstacle avoidance systems and imaging methods are also described.

15 Claims, 4 Drawing Sheets

(56) References Cited

U.S. PATENT DOCUMENTS

| | | | |
|---|---|---|---|
| 2007/0247612 A1* | 10/2007 | Pack | G01C 7/04 |
| | | | 356/4.01 |
| 2012/0044476 A1 | 2/2012 | Earhart et al. | |
| 2016/0266256 A1* | 9/2016 | Allen | G01S 17/89 |
| 2016/0282468 A1* | 9/2016 | Gruver | H05K 999/99 |
| 2017/0293810 A1 | 10/2017 | Allen et al. | |
| 2017/0307759 A1* | 10/2017 | Pei | G01S 17/10 |
| 2019/0101645 A1* | 4/2019 | DeMersseman | G01S 7/4813 |

* cited by examiner

DISTRIBUTED APERTURE SYSTEMS FOR OBSTACLE AVOIDANCE

BACKGROUND OF THE INVENTION

1. Field of the Invention

The present disclosure relates to imaging, and more to particularly to three-dimensional imaging using LIDAR systems for obstacle avoidance during vehicle navigation.

2. Description of Related Art

Vehicles, such as rotorcraft, commonly acquire information about the vehicle environment using imaging sensors carried by the vehicle. For example, some imaging sensors provide information showing terrain and objects located in the direction of the vehicle heading. Such heading imagery is useful for obstacle avoidance for the immediate navigation of the vehicle. Other imaging sensors provide information showing terrain and objects located in the vehicle periphery, i.e., off the vehicle heading. Imagery of the vehicle periphery can be useful in providing information of terrain and objects that the vehicle may encounter at a future point in time and/or in the event that heading changes are made, and can aid in navigation of the vehicle.

High resolution is generally more important for imaging sensors used to acquire heading imagery as high resolution provides early indication of hazards located along the direction of vehicle travel. As some hazards can be difficult to image at low resolution, such as power lines, high resolution advance indication of approaching hazards requiring response. Resolution is less important than coverage for imaging sensors used to acquire peripheral imagery, where incipient hazards and prospective terrain and objects typically may not require a response.

Such conventional methods and systems have generally been considered satisfactory for their intended purpose. However, there is still a need in the art for improved imaging systems, imaging methods, and obstacle avoidance systems employing such imaging systems and methods. The present disclosure provides a solution for this need.

SUMMARY OF THE INVENTION

A distributed aperture system includes a first aperture and a second aperture. The first aperture has a first field of regard and a first resolution. The second aperture has a second aperture and a second resolution and a second field of regard. The second field of regard overlaps the first field of regard and the second resolution is greater than the first resolution to provide high resolution heading information and low resolution peripheral information in a common three-dimensional (3D) image for obstacle avoidance.

In certain embodiments a first LIDAR system can be optically coupled to the first aperture and configured to generate point cloud data using electromagnetic radiation received through the first aperture. A second LIDAR system can be optically coupled to the second aperture and configured to generate point cloud data using electromagnetic radiation received through the second aperture. The first aperture can have a wide field of view, the second aperture can have a narrow field of view, and the narrow field of view can be smaller than the wide field of view.

In accordance with certain embodiments, a third aperture with a field of regard can overlap the field of regard of the first and second apertures. The third aperture can have a field of view that is about the same size as the field of view of the first aperture. The third aperture can have a field of view that is about the same size as the field of view of the second aperture. A scanning module can be operatively connected to the first aperture to scan the first aperture about the first field of regard. It is contemplated that a scanning module can be operatively connected to the second aperture to scan the second aperture about the second field of regard.

It is also contemplated that, in accordance with certain embodiments, a controller can be operatively connected to the first aperture and the second apertures. The controller can be responsive to instructions recorded on a non-transitory machine readable memory to generate first point cloud data using the electromagnetic radiation received through the first aperture for a first field of regard with a first resolution, generate second point cloud data using the electromagnetic radiation received through the second aperture for a second field of regard with a second resolution, and construct a 3D image from the first point cloud data and the second point cloud data. The second resolution can be greater than the first resolution, the second field of regard can be smaller than the first field of regard, and the second field of regard can overlap the first field of regard.

An obstacle avoidance system can have a distributed aperture system as described above. The first and second field of regard can include a direction of travel of an aircraft in forward and level flight. The second field of regard can include the periphery of the direction of travel of the aircraft in forward and level flight. The 3D image, or two-dimensional (2D) projection thereof, can be displayed in a cockpit of an aircraft. An obstacle can be avoided during flight of an aircraft using information contained with the 3D image constructed by the distributed aperture system.

An imaging method includes receiving electromagnetic radiation through a first aperture, generating a first point cloud data set using the electromagnetic radiation received through the first aperture in a first field of regard with a first resolution, and receiving electromagnetic radiation through a second aperture. A second point cloud data set is generated using the electromagnetic radiation received through the second aperture in a second field of regard with a second resolution, the second field of regard overlapping the first field of regard and being smaller than the first field of regard. A 3D image is constructed from the first and second point cloud data sets, a 3D image portion constructed from the second point cloud data set having higher resolution than a 3D image portion constructed from the first point cloud data set.

In certain embodiments receiving electromagnetic radiation through the first aperture can include scanning the first aperture about the first field of regard. In accordance with certain embodiments, receiving electromagnetic radiation through the second aperture can include scanning the second aperture about the second field of regard.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
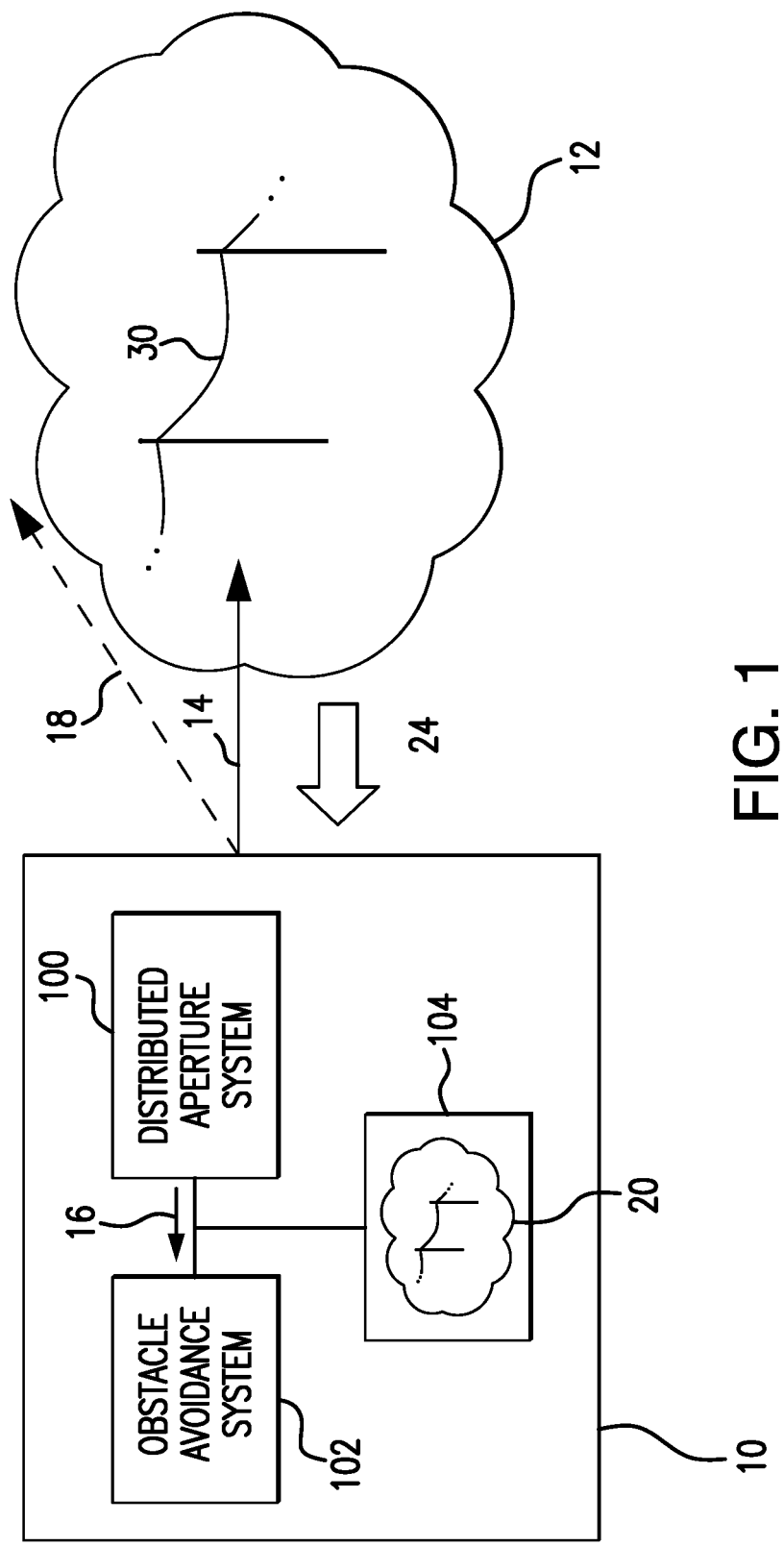
FIG. 1 is a schematic view of an exemplary embodiment of a vehicle with an obstacle avoidance system constructed in accordance with the present disclosure, showing the obstacle avoidance system imaging the vehicle environment using a distributed aperture arrangement.

Reference will now be made to the drawings wherein like reference numerals identify similar structural features or aspects of the subject disclosure. For purposes of explanation and illustration, and not limitation, a partial view of an exemplary embodiment of a distributed aperture arrangement in accordance with the disclosure is shown in FIG. 1 and is designated generally by reference character 100. Other embodiments of distributed aperture arrangements, obstacle avoidance systems, and methods of avoiding obstacles using distributed aperture arrangements in accordance with the disclosure, or aspects thereof, are provided in FIGS. 2-6, as will be described. The systems and methods described herein can be used for avoiding obstacles during the navigation of vehicles, such as rotorcraft, though the present disclosure is not limited to rotorcraft or to vehicle navigation in general.

Referring to FIG. 1, distributed aperture system 100 is shown. Distributed aperture system 100 is carried by a vehicle 10, e.g., a rotorcraft. Distributed aperture system 100 is optically coupled to a scene 12 disposed along a direction of level and forward flight 14 of vehicle 10 and is configured to generate point cloud data 16 of scene 12. Distributed aperture system 100 is disposed in communication with an obstacle avoidance system 102 and a display 104. Obstacle avoidance system 102 is configured to change the direction of vehicle 10, e.g., from direction level and forward flight 14 to an adjusted direction 18, based on point cloud data 16 provided to obstacle avoidance system 102 by distributed aperture system 100. Display 104 is carried by aircraft 10 and is configured to project a two-dimensional image 20 of scene 12 using point cloud data 16 provided to display 104 by distributed aperture system 100.

Figure 2:
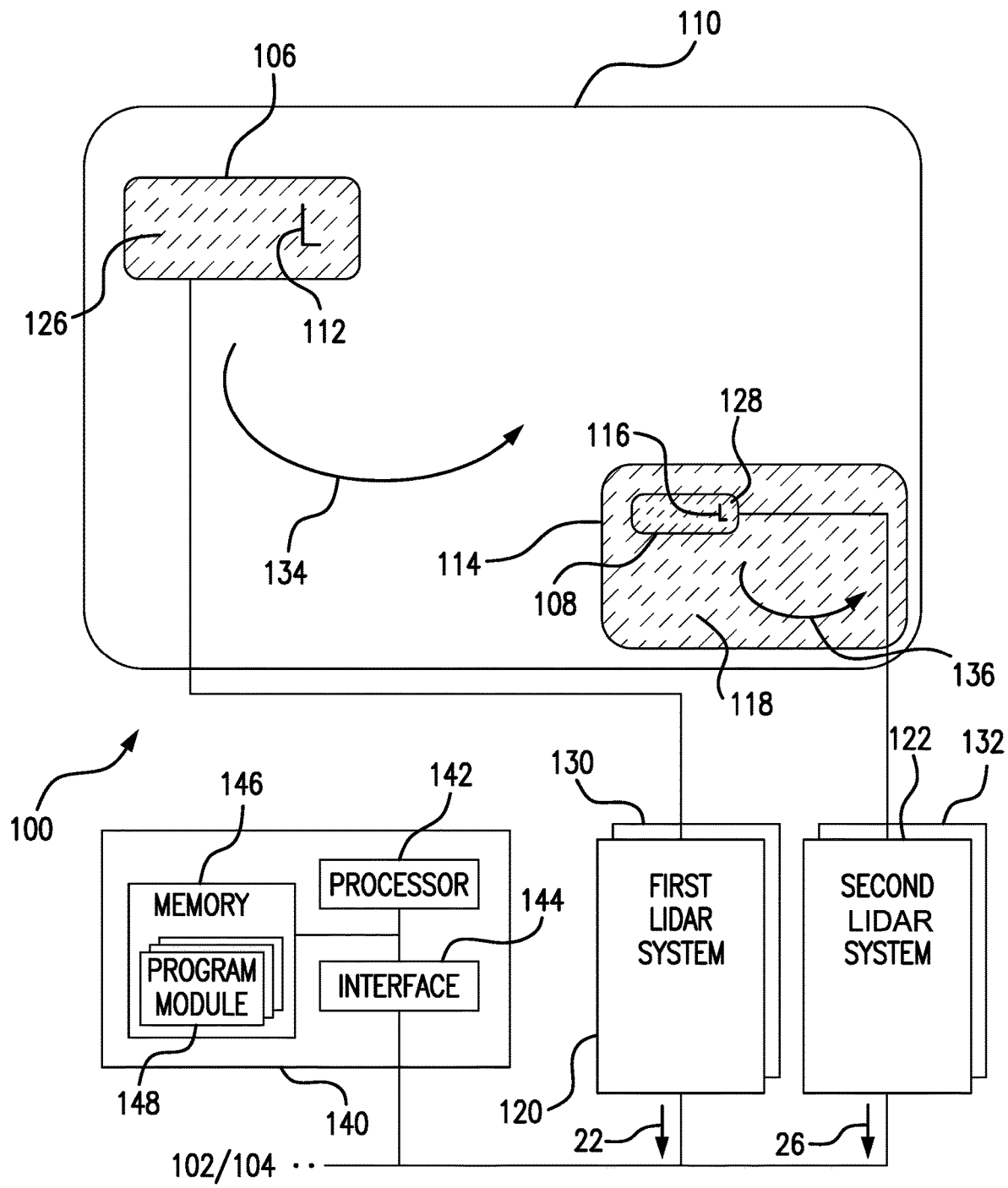
FIG. 2 is a schematic view of the distributed aperture arrangement of FIG. 1 according to an exemplary embodiment, showing two apertures located within a common field of regard.

Referring to FIG. 2, distributed aperture system 100 is shown. Distributed aperture system 100 includes a first aperture 106 and a second aperture 108. First aperture 106 has a first field of regard 110 and a first resolution 112. Second aperture 108 has a second field of regard 114 and a second resolution 116. Second field of regard 114 overlaps first field of regard 110, e.g., in an overlap region 118, and second resolution 116 is greater than first resolution 112 (as indicated by the relative size of the exemplary structures identified by reference numerals 116 and 112) to provide relatively high resolution heading information and relatively low resolution peripheral information in a common 3D image 20 (shown in FIG. 1) for obstacle avoidance.

A first LIDAR (i.e., LiDAR, LADAR, etc.) system 120 is optically coupled to first aperture 106 and is configured to generate point cloud data 22 using a portion of electromagnetic radiation received through first aperture 106. A second LIDAR system 122 is optically coupled to second aperture 108 and is configured to generate point cloud data 26 using electromagnetic radiation received through second aperture 108.

As will be appreciated by those of skill in the art in view of the present disclosure, use of LIDAR systems can be advantageous in certain applications because LIDAR systems are capable of imaging and providing ranging (or depth) information, thereby providing point cloud data suitable for constructing 2D projections (e.g., an image) of 3D models of a scene of interest. However, as will be appreciated by those of skill in the art in view of the present disclosure, imaging systems employing visible wavebands, infrared wavelengths, and infrared wavebands such as SWIR wavebands can also incorporated into distributed aperture system 100, as suitable for an intended application.

First aperture 106 has a wide field of view 126. Second aperture has a narrow field of view 128. Narrow field of view 128 is smaller than wide field of view 126, collects more electromagnetic radiation from scene 12, and therefore has better resolution but less coverage area than wide field of view 126. As will be appreciated by those of skill in the art in view of the present disclosure, narrow field of view 128 can therefore resolve small features such as power lines or wires 30 (shown in FIG. 1) at longer distances than wide field of view 126. Wide field of view 126, while less able to resolve small features, e.g., power lines or wires 30, is capable of providing information about a relatively large coverage area relative to narrow field of view 128. A drive module 130 is operably connected to first LIDAR system 120 for scanning 134 first aperture 106 throughout first field of regard 110. A drive module 132 is operably connected to second imaging system 122 for scanning 136 second aperture 108 throughout second field of regard 114.

Distributed aperture system 100 includes a controller 140. Controller 140 is operably connected to display 104, first LIDAR system 120, drive module 130, second LIDAR system 122, and drive module 132, is additionally disposed in communication with obstacle avoidance system 102, and includes a processor 142, an interface 144, and a memory 146 which are disposed in communication with one another. Memory 146 includes a non-transitory machine readable memory with a plurality of program modules 148 recorded on it that, when read by processor 142, cause controller 140 to undertake certain actions. Among those actions are performing the operations of imaging method 500 (shown in FIG. 6).

It is contemplated that controller 140 be operatively associated with first aperture 106 and second aperture 108, the instructions causing controller 140 to generate first point cloud data 22 using electromagnetic radiation received through first aperture 106 for first field of regard 110 with first resolution 112, generate second point cloud data 26 using electromagnetic radiation received through second aperture 108 for second field of regard 104 with second resolution 116, and construct 3D image 20 from first point cloud data 22 and second point cloud data 26. Second resolution 116 is greater than first resolution 112, second field of regard 114 being smaller than first field of regard 110 and overlapping first field of regard 110. In certain embodiments controller 140 further causes display 104 (shown in FIG. 1) to project a 2D projection of the 3D image of scene 12 (shown in FIG. 1) on display 104. In accordance with certain embodiments controller 140 communicates the 3D image to obstacle avoidance system 102 for navigating vehicle 10 (shown in FIG. 1).

Figure 3:
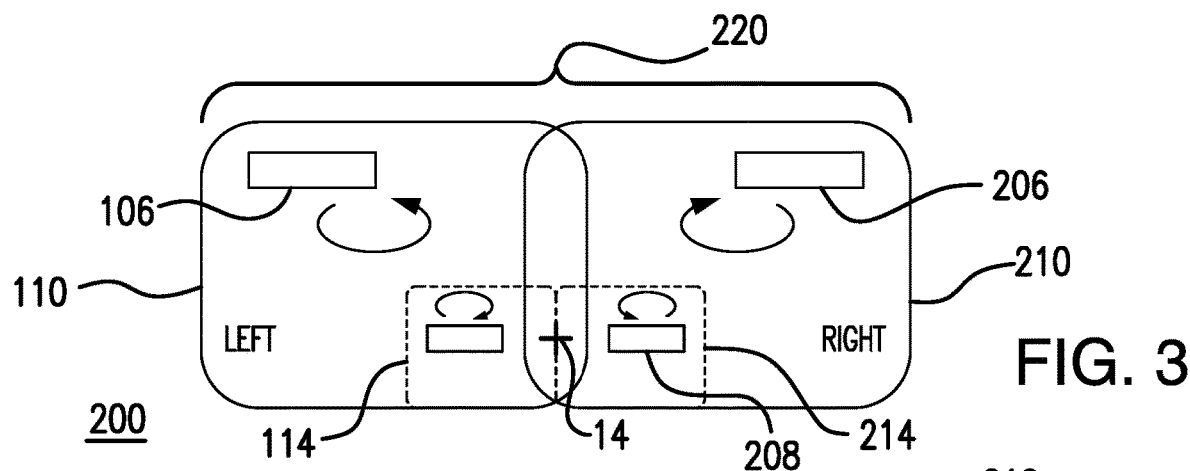
FIGS. 3-5 are schematic views of further embodiments of the distributed aperture arrangement of FIG. 1, showing embodiments having four apertures, six apertures, and eight apertures, respectively.
Figure 4:
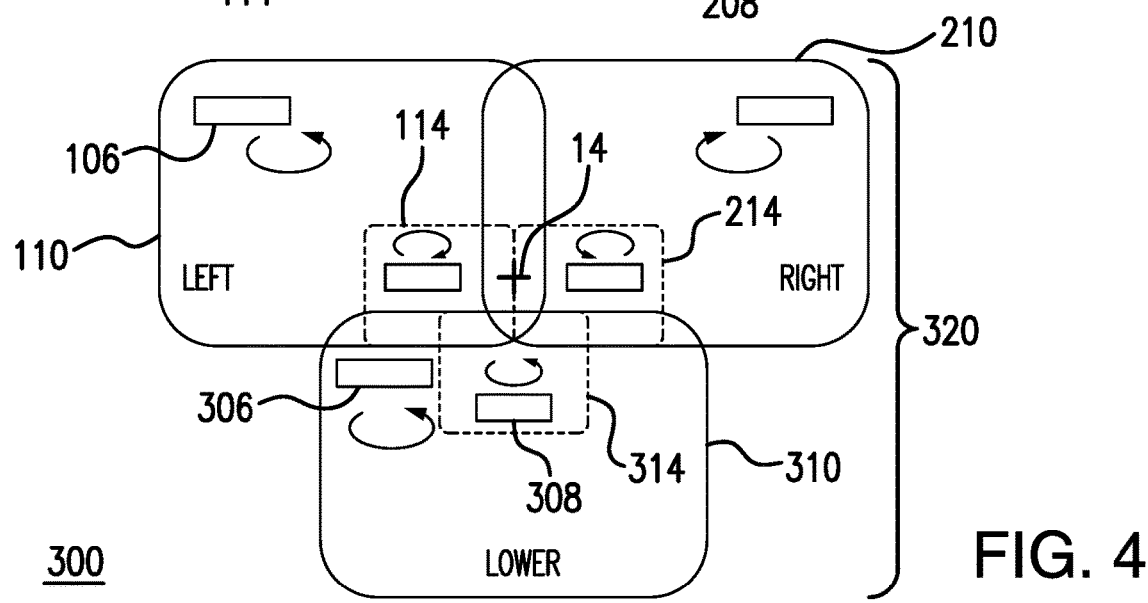
Figure 5:
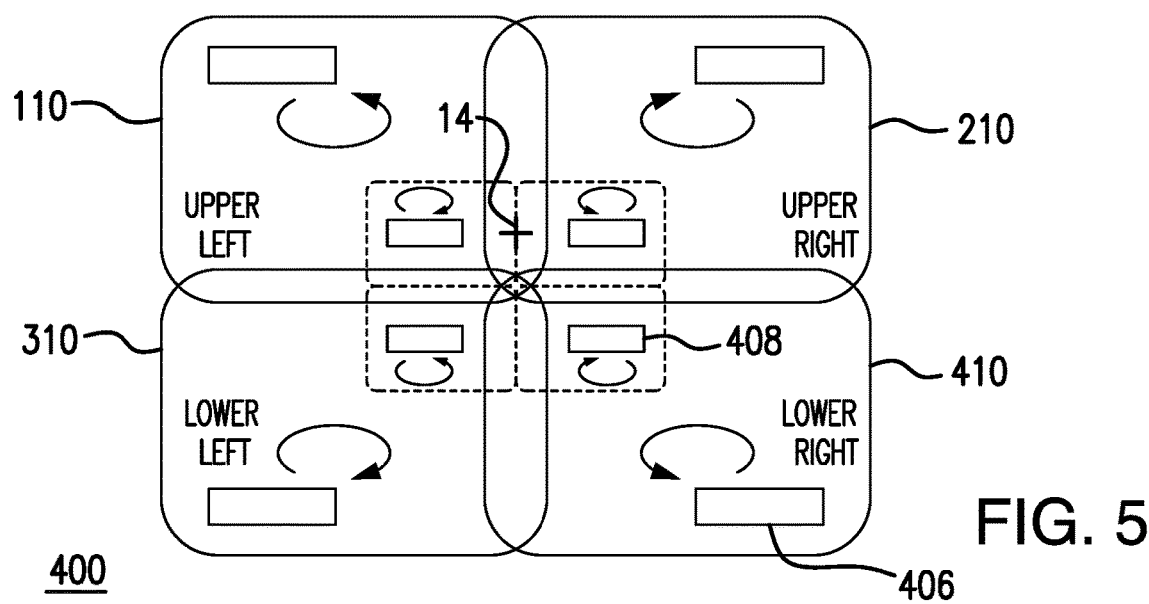

Referring to FIGS. 3-5, distributed aperture systems 200-400 are shown. With reference to FIG. 3, distributed aperture system 200 is shown. Distributed aperture system 200 is similar to distributed aperture system 100 (shown in FIG. 1) and additionally includes a third aperture 206 and a fourth aperture 208. Third aperture 206 is similar to first aperture 106 and additionally has a third field of regard 210. Third field of regard 210 is arranged to the right (level to direction of flight 14) of first field of regard 110, third field of regard 210 forming a left-side and first field of view 110 forming a right-side of a composite field of view of distributed aperture system 200.

Third field of regard 210 is registered to first field of regard 110 such that third field of regard 210 laterally overlaps a portion of first field of regard 110. This allows fourth aperture 208 to be assigned a fourth field of regard 214 adjacent to and partially overlapping second field of regard 114, providing increased coverage of scene 12 (shown in FIG. 1) for both high resolution of feature along the direction of travel and for situational awareness for lower resolution peripheral features. In certain embodiments distributed aperture arrangement 200 can have a left-right span of coverage 220 that is about 110 degrees with about 10 degrees of overlap, which is sufficient to provide suitable situational awareness suitable for landing a rotorcraft in austere conditions in degraded illumination conditions and advance indication of hazards approaching along direction of flight 14.

With reference to FIG. 4, distributed aperture system 300 is shown. Distributed aperture system 300 is similar to distributed aperture system 200 (shown in FIG. 3) and additionally includes a fifth aperture 306 and a sixth aperture 308. Fifth aperture 306 is similar to first aperture 106 and additionally has a fifth field of regard 310. Fifth field of regard 310 is arranged below (level to direction of flight 14) first field of regard 110 and third field of regard 206 for imaging scene 12 (shown in FIG. 1). First field of regard 110 forms an upper-left field of regard, third field of regard 206 forms an upper-right field of regard, and fifth field of regard 306 forms a lower field of regard of a composite field of view of distributed aperture system 300.

Fifth field of regard 306 is registered to first field of regard 110 and third field of regard 210 such that about fifth field of regard 306 overlaps a portion of both first field of regard 110 and third field of regard 210 vertically (relative to direction of travel 14). The vertical overlap allows sixth aperture 308 to be assigned a field of regard 314 abutting and partially overlapping both second field of regard 114 and fourth field or regard 214. Relative to distributed aperture system 200, the fifth aperture 306 and sixth aperture 308 provide still further coverage of scene 12 (shown in FIG. 1) for both high resolution of feature along the direction of travel 14 and greater peripheral coverage. In certain embodiments distributed aperture arrangement 300 can have a laterally-truncated up-down right span of coverage 310 of about 320 degrees, which is sufficient in certain applications to provide situational awareness suitable for landing a rotorcraft in austere conditions and/or during time intervals of degraded illumination.

With reference to FIG. 5, distributed aperture system 400 is shown. Distributed aperture system 400 is similar to distributed aperture system 300 (shown in FIG. 4) and additionally includes a seventh aperture 406 and an eighth aperture 408. Seventh aperture 406 is similar to first aperture 106, e.g., is a wide field aperture, and additionally has a seventh field of regard 410. Seventh field of regard 410 is located below (relative to level to direction of flight 14) both first field of regard 106 and third field of regard 206. During imaging first field of regard 110 and third field of regard 210 form upper-left and upper-right fields of regard. Fifth field of regard 310 and seventh field of regard 410 form lower-left and lower-right fields of regard.

As with the embodiment shown in FIG. 4, third field of regard 210 laterally overlaps a portion of first field of regard 110. Fifth field of regard 310 is registered to first field of regard 110 such that it longitudinally overlaps a lower portion of first field of regard 110 along substantially the entire longitudinal span of first field of regard 110. Seventh field of regard 410 is registered to first field of regard 110 such that it both longitudinally overlaps a lower portion of third field of regard 210 and laterally overlaps a portion of seventh field of regard 410. In certain embodiments the lateral and longitudinal overlap be about 10 percent of the lateral and longitudinal width of seventh field of regard 410.

The illustrated embodiment has three advantages. First, the coverage area (within the outer solid lines) defined in both the left-right direction and the up-down direction (relative to direction of travel 14) of the field of regard provided by the wide field apertures is large, increasing the amount of peripheral information acquired by distributed aperture system 500 during point cloud data collection (or imaging). Second, the coverage area (within the dotted lines) defined in both the left-right direction and the up-down direction (relative to direction of travel 14) of narrow field apertures is large, increasing the coverage area where high resolution point cloud data is acquired by distributed aperture system 500. Finally, a region of duplicative overlap is present in the immediate vicinity of direction of travel 14. This provides very high resolution point cloud data in the direction of travel, which can provide early indication of small objects in the direction of vehicle flight, e.g., power lines or wires 30 (shown in FIG. 1).

Figure 6:
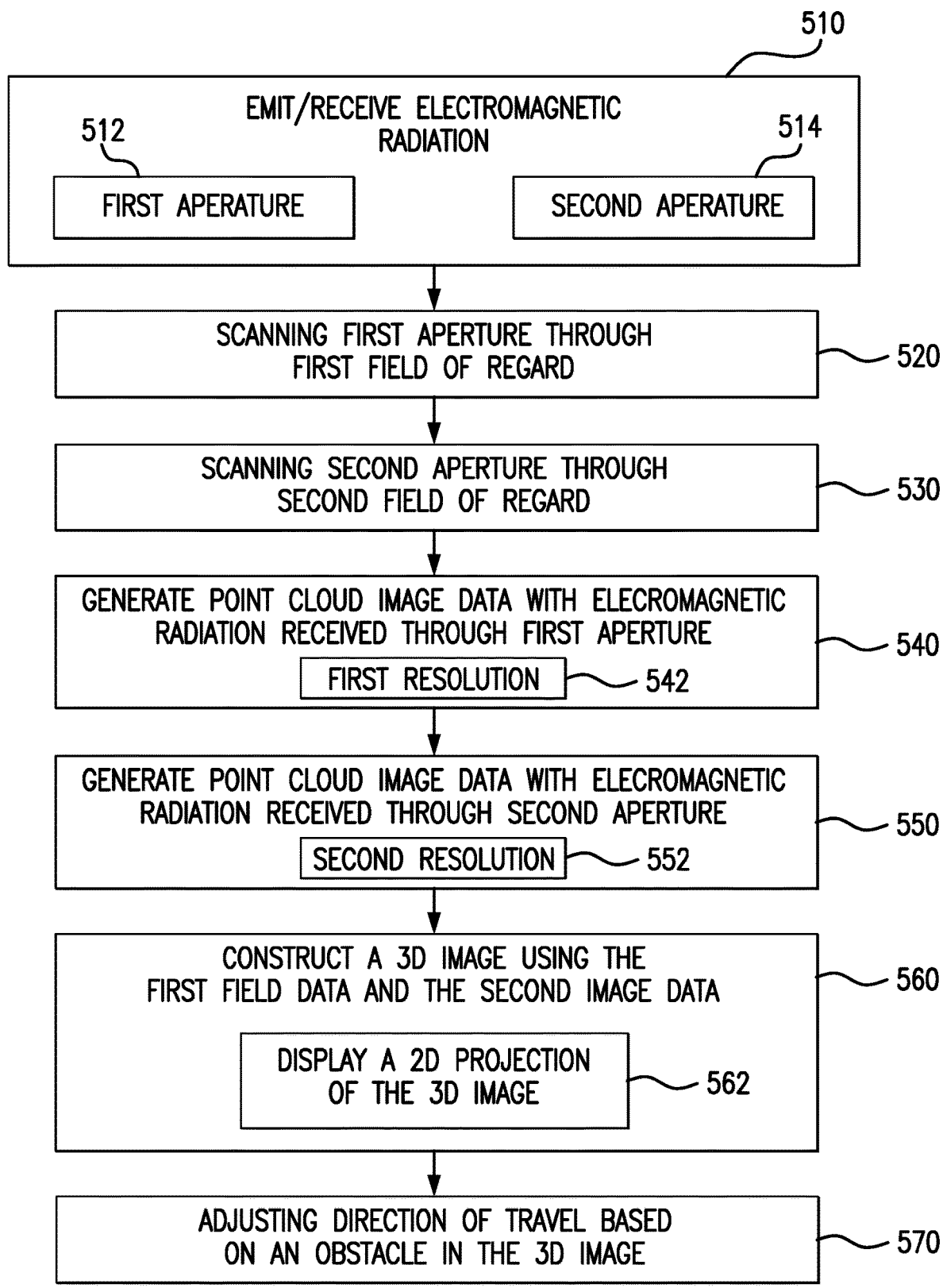
FIG. 6 is a block diagram of an exemplary embodiment of an imaging method, showing steps of the method according to an exemplary embodiment.

With reference to FIG. 6, an imaging method 500 is shown. Method 500 includes receiving electromagnetic radiation, e.g., electromagnetic radiation 24 (shown in FIG. 1), as shown in box 510. The electromagnetic radiation is received through a first aperture, e.g., first aperture 106 (shown in FIG. 1), as shown with box 512, as the first aperture is scanned through a first field of regard, e.g., first field of regard 110 (shown in FIG. 2), as shown with box 520. The electromagnetic radiation is also received through a second aperture, e.g., second aperture 108 (shown in FIG. 1), as shown with box 514, as the second aperture is scanned through a second field of regard, e.g., second field of regard 114 (shown in FIG. 2), as shown with box 530.

Point cloud data is generated using the electromagnetic radiation received through the first aperture and the second aperture, as shown with box 540. First point cloud data, e.g., first point cloud data 22 (shown in FIG. 2), is generated from the electromagnetic radiation received through the first aperture, as shown with box 540. A second point cloud data set, e.g., second point cloud data set 26 (shown in FIG. 2), is generated from the electromagnetic radiation received through the second aperture, as shown with box 550. It is contemplated that the first point cloud data have a first resolution, e.g., first resolution 112 (shown in FIG. 2), and the second point cloud data have a second resolution, e.g., second resolution 116 (shown in FIG. 2), as shown with boxes 542 and 552.

A 3D image, e.g., 3D image 20 (shown in FIG. 1), is then constructed from the first and second point cloud data sets, as shown with box 560. In certain embodiments a 2D projection of the 3D image can be displayed, as shown with box 562. It is contemplated that a 3D image portion constructed from the second point cloud data, including the direction of travel 14 (shown in FIG. 1), have higher resolution than a 3D image portion constructed from the first point cloud data. The direction of travel 14 can be changed based on information contained within the portion of the image constructed from the first 3D image portion, as shown with box 570, such as upon indication of an approaching obstacle like wire or powerline 30 (shown in FIG. 1).

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 2 is intended to provide a brief, general description of an illustrative and/or suitable exemplary environment in which embodiments of the above described present invention may be implemented. FIG. 2 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The methods and systems of the present disclosure, as described above and shown in the drawings, provide for LIDAR-based imaging systems with superior properties including the capability to image a very wide field of regard and detect small objects at long range. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A distributed aperture system, comprising:
a first, second, and third aperture pair, each aperture pair having first and second apertures, the first aperture having a first field of regard and a first resolution and the second aperture having a second field of regard overlapping the first field of regard and a second resolution, each of the first, second, and third aperture pairs having an overlapping area in which the second field of regard overlaps the first field of regard, and wherein the second field of regard is smaller than the first field of regard,
wherein the first, second, and third aperture pairs are arranged so that the first field of regard of the third aperture pair is registered to and longitudinally overlapping a portion of the first field of regard of the first aperture pair, and so that the second field of regard of the third aperture pair overlaps a portion of the second field of regard of the first aperture pair and further overlaps a portion of the second field of regard of the second aperture pair,
wherein the first and second aperture pairs are arranged so that the first field of regard of the second aperture pair is registered to and laterally overlapping a portion of the first field of regard of the first aperture pair, and so that the second field of regard of the second aperture pair overlaps a portion of the second field of regard of the first aperture pair,
wherein a first combined area defined by the first field of regard of the first, second, and third aperture pairs provides a first coverage area including non-overlapping areas having the first resolution that provides the peripheral information,
wherein a second combined area defined by overlapping areas of the first, second, and third aperture pairs provides a second coverage area that provides a portion of heading information, the second coverage area being smaller than the first coverage area,
wherein a third combined area provides a third coverage area, the third combined area being included in the second combined area and defined by at least one region of duplicative overlap in which at least two overlapping areas of the first, second, and third aperture pairs overlap, the third coverage area being smaller than the second coverage area, being in an immediate vicinity of a direction of travel, and providing another portion of the heading information, and
wherein the heading information and the peripheral information are provided in a common three-dimensional (3D) image for obstacle avoidance.

2. The distributed aperture system as recited in claim 1, further comprising a first LIDAR system optically coupled to the first aperture and configured to generate point cloud data using electromagnetic radiation received through the first aperture of the first aperture pair.

3. The distributed aperture system as recited in claim 1, further comprising a second LIDAR system optically coupled to the second aperture and configured to generate point cloud data using electromagnetic radiation received through the second aperture of the first aperture pair.

4. The distributed aperture system as recited in claim 1, wherein the first aperture of the first, second, and third aperture pairs has a wide field of view, wherein the second aperture of the first, second, and third aperture pairs has a narrow field of view, wherein the narrow field of view is smaller than the wide field of view.

5. The distributed aperture system as recited in claim 1, further comprising a driver device configured to scan operatively connected to the first aperture of the first aperture pair and configured to scan the first aperture about the first field of regard.

6. The distributed aperture system as recited in claim 1, further comprising a driver device configured to scan operatively connected to the second aperture of the first aperture pair and configured to scan the second aperture about the second field of regard.

7. The distributed aperture system as recited in claim 1, wherein the third aperture has a field of view that is about the same size as the field of view of the first aperture.

8. The distributed aperture system as recited in claim 1, further comprising a controller operatively connected to the first aperture and the second apertures, the controller responsive to instructions recorded on a non-transitory machine readable memory to:
generate first point cloud data using the electromagnetic radiation received through the first aperture of the first, second, and third aperture pairs for the first field of regard;
generate second point cloud data using the electromagnetic radiation received through the second aperture of the first, second, and third aperture pairs for the second field of regard; and
construct the 3D image from the first point cloud data and the second point cloud data, including the overlapping area.

9. The distributed aperture system as recited in claim 8, further comprising displaying the 3D image on a display carried by an aircraft.

10. The distributed aperture system as recited in claim 8, further comprising avoiding at obstacle during flight of an aircraft using information contained with the 3D image constructed by the distributed aperture system.

11. An obstacle avoidance system, comprising:
a distributed aperture system as recited in claim 1, wherein the first field of regard and the second field of regard include a direction of travel of an aircraft in forward and level flight, wherein the second field of regard includes the periphery of the direction of travel of the aircraft in forward and level flight.

12. An imaging method, comprising:
receiving electromagnetic radiation through a first aperture of each of a first, second, and third aperture pair;
for each of the first, second, and third aperture pairs, generating a first point cloud data set using the electromagnetic radiation received through the first aperture in a first field of regard with a first resolution;
for each of the first, second, and third aperture pairs, receiving electromagnetic radiation through a second aperture;
for each of the first, second, and third aperture pairs, generating a second point cloud data set using the electromagnetic radiation received through the second aperture in a second field of regard with a second resolution, the second field of regard overlapping the first field of regard, forming an overlapping area, the second field of regard being smaller than the first field of regard; and
constructing a 3D image from the first point cloud data set and the second point cloud data set of each of the first, second, and third aperture pairs,
wherein the first, second, and third aperture pairs are arranged so that the first field of regard of the third aperture pair is registered to and longitudinally overlapping a portion of the first field of regard of the first aperture pair, and so that the second field of regard of the third aperture pair overlaps a portion of the second field of regard of the first aperture pair and further overlaps a portion of the second field of regard of the second aperture pair, wherein the first and second aperture pairs are arranged so that the first field of regard of the second aperture pair is registered to and laterally overlapping a portion of the first field of regard of the first aperture pair, and so that the second field of regard of the second aperture pair overlaps a portion of the second field of regard of the first aperture pair, wherein a first combined area defined by the first field of regard of the first, second, and third aperture pairs provides a first coverage area including non-overlapping areas having the first resolution that provides the peripheral information, wherein a second combined area defined by overlapping areas of the first, second, and third aperture pairs provides a second coverage area having the high resolution that provides a portion of heading information, the second coverage area being smaller than the first coverage area, wherein a third combined area provides a third coverage area, the third combined area being included in the second combined area and defined by at least one region of duplicative overlap in which at least two overlapping areas of the first, second, and third aperture pairs overlap, the third coverage area being smaller than the second coverage area, being in an immediate vicinity of a direction of travel, and providing another portion of the heading information, and wherein the 3D image includes the heading information and the peripheral information for obstacle avoidance.

13. The method as recited in claim 12, wherein receiving electromagnetic radiation through the first aperture includes scanning the first aperture about the first field of regard.

14. The method as recited in claim 12, wherein receiving electromagnetic radiation through the second aperture includes scanning the second aperture about the second field of regard.

15. The method as recited in claim 12, further comprising displaying a two-dimensional projection of the 3D image.

* * * * *